(12) United States Patent
Schultheis et al.

(10) Patent No.: US 9,983,077 B2
(45) Date of Patent: May 29, 2018

(54) CAPACITIVE FORCE SENSOR WITH DIAPHRAGM BODY HAVING AN EXTENDING FREE END FORMING A CANTILEVER PORTION

(71) Applicant: PREH GMBH, Bad Neustadt A.D. Saale (DE)

(72) Inventors: Thilo Schultheis, Bad Neustadt A.D. Saale (DE); Johannes Duenninger, Wittershausen (DE)

(73) Assignee: PREH GMBH, Bad Neustadt A.D. Saale (DE)

( * ) Notice: Subject to any disclaimer, the term of this patent is extended or adjusted under 35 U.S.C. 154(b) by 0 days. days.

(21) Appl. No.: 15/532,101

(22) PCT Filed: Nov. 9, 2015

(86) PCT No.: PCT/EP2015/076027
§ 371 (c)(1),
(2) Date: Jun. 1, 2017

(87) PCT Pub. No.: WO2016/087159
PCT Pub. Date: Jun. 9, 2016

(65) Prior Publication Data
US 2017/0268946 A1    Sep. 21, 2017

(30) Foreign Application Priority Data

Dec. 5, 2014   (DE) .......................... 10 2014 117 991

(51) Int. Cl.
*G01L 1/14*    (2006.01)
*G01L 5/00*    (2006.01)

(52) U.S. Cl.
CPC .............. *G01L 5/0038* (2013.01); *G01L 1/14* (2013.01)

(58) Field of Classification Search
CPC ................................. G01L 1/14; G01L 5/0038
See application file for complete search history.

(56) References Cited

U.S. PATENT DOCUMENTS 4,408,194 A * 10/1983 Thompson ............ F16K 17/162
                                                            137/68.18
4,784,577 A * 11/1988 Ritson ............... A61M 5/14224
                                                            417/219

(Continued)

FOREIGN PATENT DOCUMENTS

| EP | 0 456 873 A1 | 11/1991 | |
|---|---|---|---|
| EP | 2 154 503 A2 | 2/2010 | |
| WO | WO 2005054804 A1 * | 6/2005 | ............. G01F 23/18 |

*Primary Examiner* — Harshad R Patel
*Assistant Examiner* — Jamel Williams
(74) *Attorney, Agent, or Firm* — Norman B. Thot

(57) ABSTRACT

A capacitive force sensor includes a base body, a diaphragm body, two spacers arranged between the base body and the diaphragm body, the two spacers supporting the diaphragm body on the base body, a free end formed by the diaphragm body projecting beyond one of the two spacers, a cavity formed between the diaphragm body and the base body in a region between the two spacers so that the diaphragm body bends when a force acts on the diaphragm body in the region between the two spacers, a first electrode arranged at the free end, a second electrode arranged on the base body, and an electrical contact device which makes an electrical contact with the first and second electrode. The first and second electrode define a precision capacitance meter with a measuring capacitance which changes with an action of the force.

14 Claims, 3 Drawing Sheets

(56) References Cited

U.S. PATENT DOCUMENTS

| | | | | |
|---|---|---|---|---|
| 4,944,187 | A | * | 7/1990 | Frick .................... G01L 9/0042 338/4 |
| 5,134,886 | A | | 8/1992 | Ball |
| 6,122,973 | A | | 9/2000 | Nomura et al. |
| 6,257,068 | B1 | * | 7/2001 | Briefer ................. G01L 9/0072 361/283.4 |
| 8,890,391 | B2 | * | 11/2014 | Koyama ............... G01P 15/097 310/330 |
| 2004/0211251 | A1 | * | 10/2004 | Lee ................. G01N 33/54373 73/146.3 |
| 2010/0033196 | A1 | | 2/2010 | Hayakawa et al. |
| 2011/0227872 | A1 | | 9/2011 | Huska et al. |
| 2012/0026087 | A1 | | 2/2012 | Ke |
| 2015/0207435 | A1 | * | 7/2015 | Rombach ............. B81B 3/0072 310/300 |

\* cited by examiner

CAPACITIVE FORCE SENSOR WITH DIAPHRAGM BODY HAVING AN EXTENDING FREE END FORMING A CANTILEVER PORTION

CROSS REFERENCE TO PRIOR APPLICATIONS

This application is a U.S. National Phase application under 35 U.S.C. § 371 of International Application No. PCT/EP2015/076027, filed on Nov. 9, 2015 and which claims benefit to German Patent Application No. 10 2014 117 991.9, filed on Dec. 5, 2014. The International Application was published in German on Jun. 9, 2016 as WO 2016/087159 A1 under PCT Article 21(2).

FIELD

The present invention relates to a capacitive force sensor having a base body and a flat, elastically yielding diaphragm body.

BACKGROUND

The diaphragm body in previously described force sensors is supported on the base body via one or more spacers so that a cavity is formed between the diaphragm body and the base body which is limited by one side of the diaphragm body and by one side of the base body. The volume of the cavity changes when a force acts on the diaphragm body. The surfaces of the base body and the diaphragm body limiting the cavity have a metal layer or coating, thereby forming electrodes opposite to each other of a precision capacitance meter having measuring capacitance. The cavity is filled with air as a dielectric medium for measuring.

The diaphragm body has a certain elastic flexibility and responds to a force acting thereon by bending. This changes the distance of the electrodes to each other and thereby the capacitance of the capacitor, which is defined by the cavity and the electrodes, respectively. Appropriate capacitive force sensors are often part of electronics. The base body is therefore known to be formed from a circuit board together with the associated electrode, as is described, for example, in U.S. Pat. No. 5,134,886. A disadvantage of these force sensors is that the cavity that is provided for bending under action of force also defines the measuring capacitance. Mechanical and electrical measuring properties therefore mutually influence each other. This is disadvantageous in both the mechanical and electrical configuration of a capacitive force sensor.

SUMMARY

An aspect of the present invention is to provide a capacitive force sensor where those properties can be configured independently of each other while simultaneously providing a high mechanical sturdiness and a thermal durability of the force sensor.

In an embodiment, the present invention provides a capacitive force sensor which includes a base body, a diaphragm body which is configured to be flat and elastically yielding, two spacers arranged a distance from each another between the base body and the diaphragm body, the two spacers being configured to support the diaphragm body on the base body, a free end formed by the diaphragm body being configured to project beyond at least one of the two spacers, a cavity formed between the diaphragm body and the base body in a region between the two spacers so that the diaphragm body bends when a force acts on the diaphragm body in the region between the two spacers, a first electrode arranged at the free end, a second electrode arranged on the base body, and an electrical contact device configured to make an electrical contact with the first electrode and with the second electrode. The first electrode and the second electrode define a precision capacitance meter comprising a measuring capacitance which changes with an action of the force.

BRIEF DESCRIPTION OF THE DRAWINGS

The present invention is described in greater detail below on the basis of embodiments and of the drawings in which.

DETAILED DESCRIPTION

Figure 1:
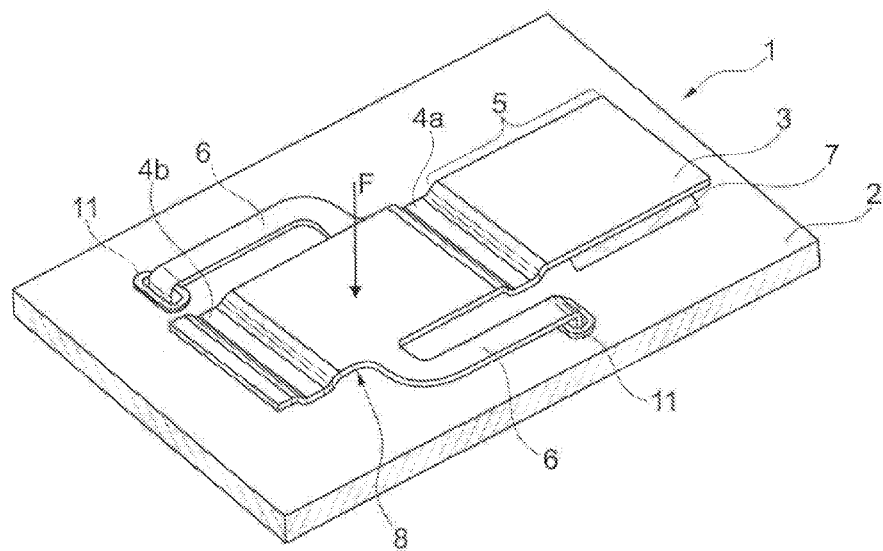
FIG. 1 shows an elevational view of an embodiment of the force sensor according to the present invention.

In an embodiment, the present invention provides a capacitive force sensor which comprises a base body and a flat, elastically yielding diaphragm body. Two spacers are arranged spaced apart from each other between the base body and the diaphragm body, wherein the diaphragm body is supported on the base body via the spacers. The diaphragm body projects beyond at least one of the spacers to form a free end with a projecting part. Between the diaphragm body and the base body, a cavity is formed in the region between the spacers. This allows the diaphragm body to bend when a force acts on the diaphragm body. A first electrode is provided at the free end and a second electrode is provided at the base body. The first and second electrodes thereby define a measuring capacitance which changes with the action of force. A change in measuring capacitance results, for example, from a positional change in relation to the second electrode of the free end, resulting from a region-wise bending. The present invention also provides a device for electrically contacting the first and second electrode. "Flat" as used in the present invention means a body which, in two directions, has dimensions that are significantly larger, for example, at least by the factor of 10 larger, than in the remaining direction. The dimension of the diaphragm body in this latter direction can, for example, be less than 2 mm, for example, 1.5 or 1.0 mm, or, for example, less than 1 mm, for example, 0.5 mm. The diaphragm body can, for example, be formed as a rectangular sheet material.

The spatial separation of force action and measuring capacitance which results according to the present invention advantageously allows the setting of mechanical and electrical properties independently of each other. The mechanical properties can, for example, be specified by configuring the diaphragm body, such as by selecting the material, dimension, strength, selecting the clearance between the spacers, and the spacing between the diaphragm body and the base body, while the electrical properties can be set by the degree of projection of the free end, and by the orientation and distance to the base body thereof.

The configuration of the force sensor according to the present invention also allows for arranging of a cutout in the diaphragm body in the region between the spacers. This cutout does not hamper the measuring capacitance.

In an embodiment of the present invention, the base body can, for example, be a circuit board and the second electrode can, for example, be formed by a metal coating or by a metal layer of the circuit board. The circuit board according to the present invention comprises a non-conductive, single or multi-layer circuit board substrate, having conductive, for example, metal layers, applied thereon or inserted therein. The second electrode can, for example, be arranged below the free end of the diaphragm body and can, for example, be arranged on the surface of the circuit board facing the free end. In an embodiment of the present invention, the conductive layer can, for example, be embedded in the circuit board substrate. In an embodiment of the present invention, the conductive coating can, for example, be coated with a non-conductive protective lacquer. The metal coating can, for example, be a copper coating that is provided on the surface of the circuit board substrate facing the diaphragm body. The copper layer may additionally be gold-plated. This conductive layer or coating defines the second electrode of the at least two electrodes of the capacitor having a force-dependent measuring capacitance provided by the force sensor.

In an embodiment of the present invention, the clearance between the spacers can, for example, be lower than the degree to which the free end projects beyond the nearest spacer. An especially large change of capacitance is thereby caused during bending and due to lifting the free end resulting therefrom.

In an embodiment of the capacitive force sensor of the present invention, the measuring capacitance can, for example, decrease with an increasing action of force pressing the diaphragm body onto the base body, for example, the distance between the free end will be increased proportionally to the action of force. A high resolution of the force sensor will thereby be achieved in the beginning of its measuring range. Maximum operating safety and electromagnetic immunity will lastly be achieved in the unloaded state. Provision can, for example, be made so that, under any action of force, the free end is not supported by the base body. Provision can, for example, be made that, under any action of force, the free end in the region thereof, which is opposite to the second electrode, has a maximum clearance distance to the second electrode of 0.25 mm, for example, a maximum of 0.1 mm. The above-mentioned support can, for example, be configured so that an electrical abutting contact of the first and second electrodes is excluded, despite being supported. With these configurations, it is advantageous when the working point of the force sensor according to the present invention is located in a region where the ratio of change of measuring capacitance and stroke is increased with the associated action of force so as to thereby improve a resolution of the force sensor.

For ease of manufacture of the force sensor according to the present invention and for ease of electrical contact, the diaphragm body is a spring-resilient metal part which forms the second electrode of the force sensor. The diaphragm body can, for example, be a spring-steel strip.

In an embodiment of the present invention, the diaphragm body and the spacers can, for example, be integrally formed.

The spacers can, for example, be embossed into the diaphragm body. The spacers can, for example, be embossed as beadings which run parallel to each other into the diaphragm body which is formed as a sheet metal part.

To improve contact and/or to safely secure the diaphragm body, the device for electrical contact can, for example, comprise at least one lateral boom formed on the diaphragm body. Two booms can, for example, be provided at opposite sides of the diaphragm body. The attachment point of the at least one boom at the diaphragm body, i.e., the transition area between the diaphragm body and the respective boom, can, for example, be in the region between the two spacers, for example, closer to one of the spacers. With two spacers, the attachment points thereof can, for example, also be arranged offset to each other.

"Laterally" as used in the present invention means that the boom extends from the outer circumference of the diaphragm body. It can, for example, mostly extend in the plane defined by the flat configuration of the diaphragm body. The boom can, for example, be provided for soldering the diaphragm body to the circuit board. The boom prevents excessive heat input into the diaphragm body during soldering to the circuit board.

In an embodiment of the present invention, the respective base body and circuit board can, for example, comprise a recess or bore hole, for example, a through hole, and the at least one boom, with its free end, for example with a cranked part, can, for example, be inserted to engage the bore hole. A secure retention of the diaphragm body is thereby achieved. A secure pre-positioning prior to soldering will in particular be achieved, thereby making possible a soldering via a reflow process, in wave or bulk baths.

In an embodiment of the present invention, the at least one boom, to a minor degree, can, for example, extend sectionwise in the circumferential direction of the diaphragm body so as to minimize the design volume occupied by the diaphragm body. With two booms, they can, for example, also extend in directions opposite to each other.

In an embodiment of the present invention, at least the diaphragm body, for example, the diaphragm body and the at least one spacer, for example, the diaphragm body, the at least one spacer, and the at least one boom, can, for example, be manufactured as stampings.

The present invention also relates to an operating element which, in one of the above-described embodiments, comprises a capacitive force sensor and a movable actuating member defining an operating surface which acts on the diaphragm body, and an evaluation unit, to measure an operation force applied to the actuating member by the capacitive force sensor. The actuating member can, for example, further comprise a touch sensitive surface to perform a site-resolving touch detection, with the operating force being measured by the capacitive force sensor. In particular with the above-described diaphragm body provided with a cut out, the cut out may be advantageously be used to enable a backlighting of the operating surface of the actuating member without compromising the constructive configuration of the measuring capacitance.

The present invention will be described in more detail below based on the drawings. The drawings are thereby intended to be understood as being exemplary and to merely to represent various embodiments.

Figure 2:
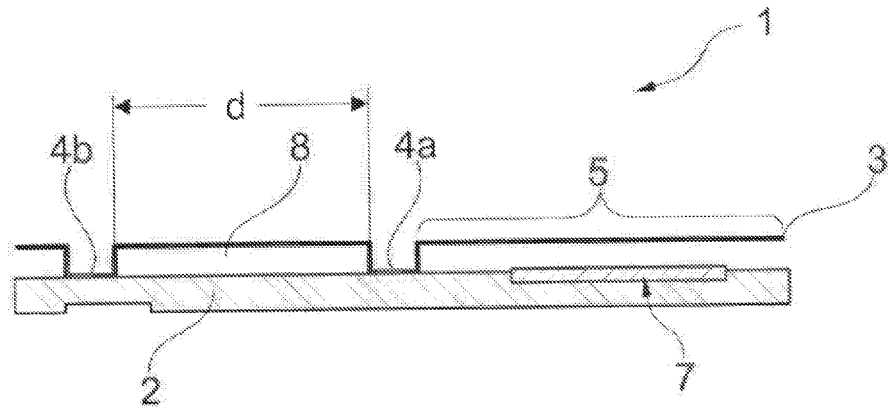
FIG. 2 shows a sectional view of the force sensor of FIG. 1 in an "unloaded" state.

FIG. 1 shows the structure of the force sensor 1 according to the present invention and in particular shows the shaping of the diaphragm body 3 which is made of an electrically conductive metal. The diaphragm body 3 is essentially formed as a rectangular spring-steel strip. Parallel to the narrow side thereof, two beadings 4a, 4b are embossed into the diaphragm body 3 to act as the spacers 4a, 4b. As it is additionally shown in FIG. 2, the diaphragm body 3 is exclusively supported on a base body 2 via the spacers 4a, 4b. The base body 2 is a circuit board which comprises a circuit board substrate and a copper coating 7. The side of the diaphragm body 3 facing the circuit board 2 and the side of the circuit board 2 facing the diaphragm body 3 define a cavity 8 whose clearance distance is defined by the distance of the spacers 4a, 4b parallel to the circuit board 2. The diaphragm body 3 comprises a rectangular part 5 projecting beyond the spacer 4a, which form a free end 5 and, in the unloaded state, extends parallel to the base body 2, as it is shown in FIG. 2. The free end 5 in particular defines a first electrode of a precision capacitance meter 9, which is further defined by a base-side second electrode 7 whose capacitance reflects the shaping, and hence the compressive load, of the diaphragm body 3. The second electrode 7 is formed by the copper coating on the circuit board 2 below the free end 5 of the diaphragm body 3. The copper coating/second electrode 7 is electrically insulated opposite of the diaphragm body 3.

Figure 3:
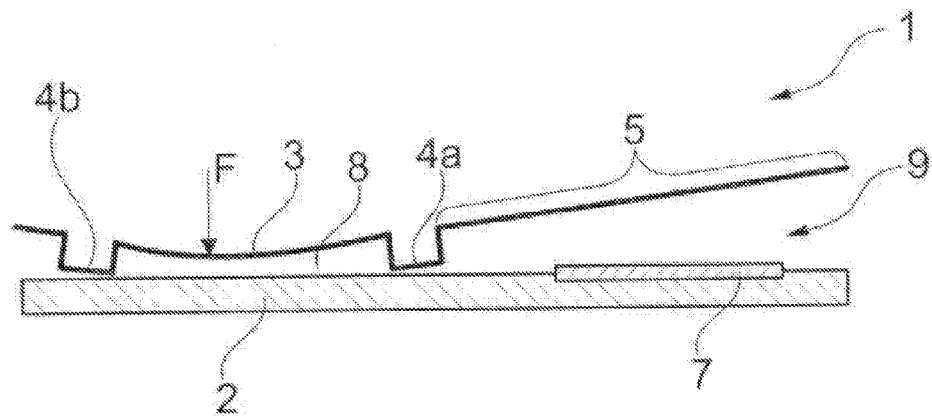
FIG. 3 shows a sectional view of the force sensor of FIG. 1 under action of force.

Since the diaphragm body 3, including the beadings 4a, 4b formed therein, are punched out of a spring steel panel, the diaphragm body 3 is elastically yielding and responds to a perpendicular force action F via an elastic bending. This decreases a volume of the cavity 8. The bending also provides for a lifting and a tilting of the free end 5 about a tilting edge defined by the spacer 4a, as it is shown in FIG. 3. The measuring capacitance of the precision capacitance meter 9, which is arranged outside the force flow, decreases and is determined by an evaluation unit not represented in FIGS. 1 to 3. Two booms 6 are formed on the diaphragm body 3 to positionally fix and to electrically contact the diaphragm body 3 or the free end 5 forming the first electrode, respectively. The boom 6 and the diaphragm body 3 are punched out of a spring steel panel as an integral sheet metal part, wherein the complete sheet metal part is also surface-plated with gold. The booms 6 are attached offset to each other at the long sides of the diaphragm body 3 in the region between the spacers 4a, 4b and subsequently extend in the opposite direction in the circumferential direction along the diaphragm body 3, wherein they extend parallel spaced apart to the outer circumference thereof. They are cranked at their free outermost ends and extend essentially perpendicular to the planes defined by the diaphragm body 3. The cranked ends are each inserted into a through-bore 11 of the circuit board 2 and are soldered. The first electrode 7 of the precision capacitance meter 9 may be electrically contacted by the evaluation unit (not shown in the drawings) via the soldering.

Figure 4:
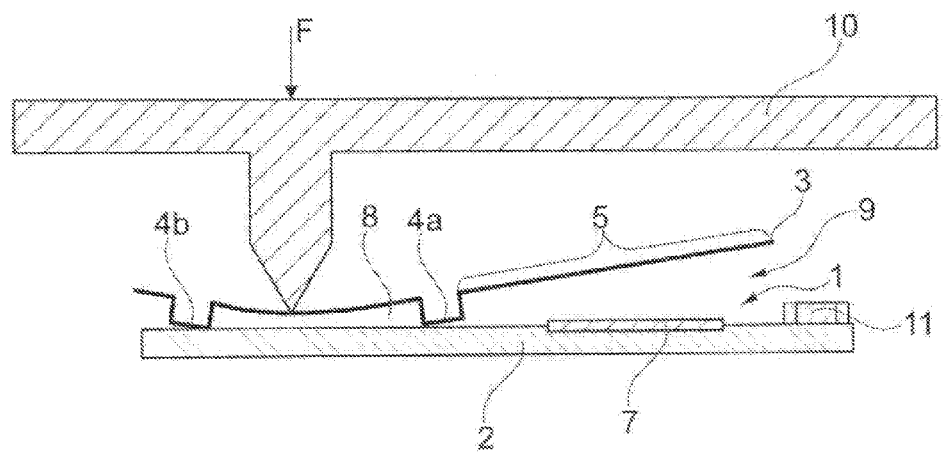
FIG. 4 shows a sectional view of an operating element according to the present invention having a force sensor of FIG. 1.

In the operating element shown in FIG. 4, the perpendicular compressive load of the diaphragm body 3 is performed by a movably mounted actuating member 10 which is only represented partially in FIG. 4 and which can, for example, have a touchpad for site-resolving touch detection. The actuating member 10 defines an operating surface on the side facing away from the force sensor 1. Upon action of a force, the force will be transferred via a plunger-like extension onto the diaphragm body 3 of the force sensor 1 described by making reference to the FIGS. 1 to 3.

Figure 5:
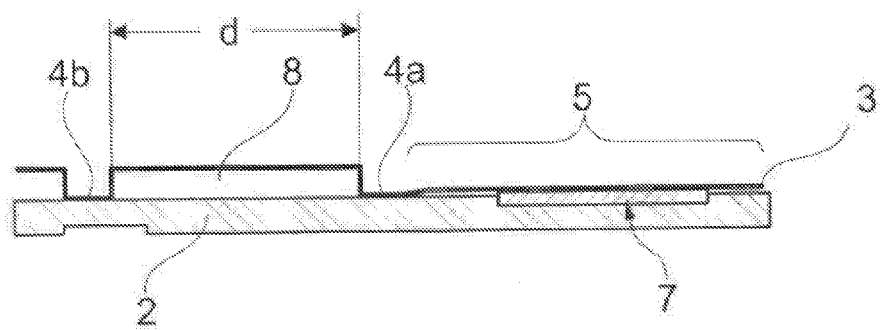
FIG. 5 shows a sectional view of another embodiment of the force sensor of the present invention in the "unloaded" state.
Figure 6:
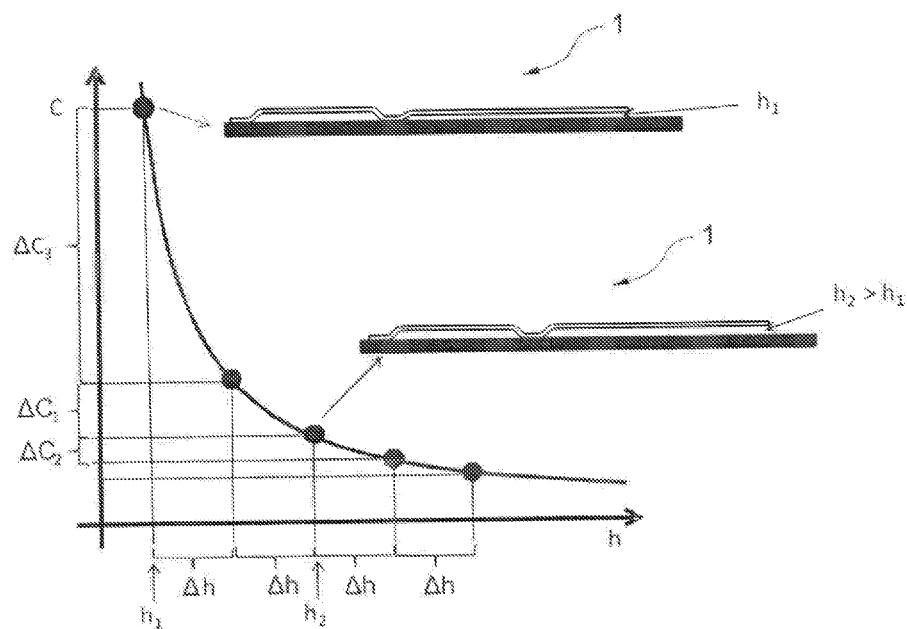
FIG. 6 shows a representation for illustrating the influence of the working point onto the measuring performance of the force sensor according to the present invention.

A force sensor is schematically represented in FIG. 5, wherein the clearance h of the free end 5 of the diaphragm body 3, in the unloaded state of the force sensor 1, in comparison to the embodiment shown in FIG. 1, has a reduced distance to the circuit board 2 and in particular to the second electrode 7. The clearance h of the free end 5, under no action of force will, for example, be h=0.10 mm or less; the free end 5 can, for example, bear against the second electrode 7. This configuration provides that the working point of the force sensor according to the present invention is provided in a region where the ratio of change of measuring capacitance $\Delta C$ and stroke $\Delta h$ is increased with an increased action of force to thereby improve the resolution of force sensor 1. This will be elucidated in two embodiments in FIG. 6. Said embodiments are different in the clearance between the free end 5 and the second electrode 7 in the unloaded state of the force sensor 1. A very close approach in the unloaded state has the advantage, as it is shown in FIG. 6, that high changes in capacitance $\Delta C$ may be caused with the same stroke. If, for example, a stroke $\Delta x$ of the free end effected by an action of force starting from a clearance $d_2$ effects a change of capacitance $\Delta C_2$, the equal change of stroke $\Delta x$ effected by an action of force results in a larger change of capacitance $\Delta C_3$ at a distance $d_1$, which distance $d_1$ is smaller than distance $d_2$. The displacement of the working point of the force sensor 1 that is effected thereby lastly provides for a higher resolution and/or a higher interference immunity.

The characteristics individually set forth in the claims may be combined in any technologically reasonable order showing further embodiments according to the present invention. The description, especially in combination with the associated drawings, further characterizes and specifies the present invention. The present invention is not limited to embodiments described herein; reference should be had to the appended claims.

LIST OF REFERENCE NUMERALS

1 Force sensor
2 Base body/circuit board
3 Diaphragm body
4a Beading/spacer
4b Beading/spacer
5 Rectangular part/free end/first electrode
6 Boom
7 Copper coating/second electrode
8 Cavity
9 Precision capacitance meter
10 Actuating member
11 Through-bore
d Distance
F Perpendicular force action
H Clearance

What is claimed is:
1. A capacitive force sensor comprising
  a base body;
  a diaphragm body which is configured to be flat and elastically yielding;
  two spacers arranged a distance from each another between the base body and the diaphragm body, the two spacers being configured to support the diaphragm body on the base body;
  a free end formed by the diaphragm body being configured to project beyond at least one of the two spacers;
  a cavity formed between the diaphragm body and the base body in a region between the two spacers so that the diaphragm body bends when a force acts on the diaphragm body in the region between the two spacers;
  a first electrode arranged at the free end;
  a second electrode arranged on the base body; and an electrical contact device configured to make an electrical contact with the first electrode and with the second electrode, wherein, the first electrode and the second electrode define a precision capacitance meter comprising a measuring capacitance which changes with an action of the force.

2. The capacitive force sensor as recited in claim 1, wherein, the base body is a circuit board, and the second electrode is formed by a conductive coating or by a conductive layer on the circuit board.

3. The capacitive force sensor as recited in claim 1, wherein, the free end comprises a length, and the distance between the two spacers is less than the length of the free end.

4. The capacitive force sensor as recited in claim 1, wherein the measuring capacitance decreases as the force pressing the diaphragm body against the base body increases.

5. The capacitive force sensor as recited in claim 1, wherein the free end is not supported on the base body at any of the action of the force.

6. The capacitive force sensor as recited in claim 1, wherein the free end, at any of the action of the force, in a region of the second electrode, comprises a clearance having a maximum of 0.25 mm to the second electrode.

7. The capacitive force sensor as recited in claim 1, wherein the diaphragm body is provided as a spring-elastic metal part which forms the first electrode.

8. The capacitive force sensor as recited in claim 1, wherein the diaphragm body and the two spacers are formed integrally.

9. The capacitive force sensor as recited in claim 1, wherein the two spacers are impressed into the diaphragm body.

10. The capacitive force sensor as recited in claim 1, wherein the diaphragm body comprises a cut out between the two spacers.

11. The capacitive force sensor as recited in claim 1, wherein the electrical contacting device comprises at least one lateral boom which is formed on the diaphragm body.

12. The capacitive force sensor as recited in claim 11, wherein the at least one lateral boom is configured to extend in a circumferential direction of the diaphragm body.

13. The capacitive force sensor as recited in claim 1, wherein at least the diaphragm body is provided as a stamped part.

14. An operating element comprising:

a capacitive force sensor as recited in claim 1;

a movable actuating member which defines an operating surface which acts on the diaphragm body; and an evaluation unit configured to measure an operating force applied to the actuating member by the capacitive force sensor.

\* \* \* \* \*